US011238151B2

(12) United States Patent
Kim et al.

(10) Patent No.: US 11,238,151 B2
(45) Date of Patent: Feb. 1, 2022

(54) METHOD AND APPARATUS FOR PATCHING BINARY HAVING VULNERABILITY

(71) Applicant: KOREA INTERNET & SECURITY AGENCY, Naju-si (KR)

(72) Inventors: Hwan Kuk Kim, Naju-si (KR); Tae Eun Kim, Naju-si (KR); Dae Il Jang, Naju-si (KR); Han Chul Bae, Naju-si (KR); Jong Ki Kim, Naju-si (KR); Soo Jin Yoon, Naju-si (KR); Jee Soo Jurn, Naju-si (KR); Geon Bae Na, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 350 days.

(21) Appl. No.: 16/189,033

(22) Filed: Nov. 13, 2018

(65) Prior Publication Data
US 2020/0134172 A1    Apr. 30, 2020

(30) Foreign Application Priority Data

Oct. 31, 2018    (KR) .......................... 10-2018-0131473

(51) Int. Cl.
*G06F 21/54*    (2013.01)
*G06F 21/57*    (2013.01)
*G06F 8/65*    (2018.01)
*G06F 9/445*    (2018.01)
*H04L 29/08*    (2006.01)

(52) U.S. Cl.
CPC .............. *G06F 21/54* (2013.01); *G06F 8/65* (2013.01); *G06F 9/445* (2013.01); *G06F 21/577* (2013.01); *G06F 2221/033* (2013.01); *H04L 67/34* (2013.01)

(58) Field of Classification Search
CPC . G06F 21/54; G06F 8/65; G06F 9/445; G06F 21/577; G06F 2221/033; G06F 21/57; G06F 21/52; G06F 11/36; G06F 11/3692; G06F 8/70; H04L 67/34
See application file for complete search history.

(56) References Cited

U.S. PATENT DOCUMENTS

| 10,585,660 B2 * | 3/2020 | Murthy ................. G06F 21/577 |
| 2005/0198517 A1 * | 9/2005 | Ivanov .................. G06F 21/125 |
| | | 713/187 |

(Continued)

FOREIGN PATENT DOCUMENTS

| CN | 103744709 A | 4/2014 |
| JP | 4652736 A | 2/2005 |
| JP | 5039728 A | 9/2010 |

(Continued)

*Primary Examiner* — Quazi Farooqui
(74) *Attorney, Agent, or Firm* — Studebaker & Brackett PC

(57) ABSTRACT

There is provided a method of patching a binary having vulnerability which is performed by a computing device. The method comprises loading a first binary to be patched, into a memory, generating a second binary by patching to call a stack frame initialization function from a vulnerable function of the first binary, executing the stack frame initialization function by calling the vulnerable function when the second binary is executed and initializing a stack frame area of the vulnerable function so as to automatically initialize a variable declared in the vulnerable function.

6 Claims, 15 Drawing Sheets

(56) References Cited

U.S. PATENT DOCUMENTS

2015/0234736 A1* 8/2015 Koju .................. G06F 8/443
              717/131
2016/0028767 A1   1/2016 Ripoll et al.

FOREIGN PATENT DOCUMENTS

| KR | 20100089256 A | 8/2010 |
| KR | 20100105210 A | 9/2010 |
| KR | 10-1530132 B1 | 6/2015 |

* cited by examiner

FIG. 4

```
#define NEXT-SZ 1000
int main(void)
{
    int input = user-input ();                      411
    foo(input);        // assume input=0            412
    return 0;
}
void foo(ctl)
{
    int aN, bN;
    switch (ctl)
    {
        case -1:
            aN = 0;
            bN = 0;
            break;
        case 1:
            aN = i + NEXT_SZ;
            bN = i – NEXT_SZ;
            break;
        default:                                     413
            aN = 50;
            aN = 100;    // initialize aN variable due to error in development stage
            break;
    }
    repaint(aN, bN);
}
int repaint(int a, int b)                            414
{
    Char *buf_length, *buf_width;

buf_length = malloc(a);
    buf_width = malloc(b);    //assign memory having unexpected size, occurrence of collision depending on system
    ...
}
```

415

| 421 | push %ebp | //push existing base point register value |
| | mov %esp, %ebp | //change base point register value to stack point value |
| | sub $0x10, %esp | //reduce stack point value as much as 0×10 (stack frame size) |

```
include <stdio.h> define PATH_CONFIG "./config"

void init(void)
{
    FILE *fp = fopen(PATH-CONFIG, "r");
    char a[1] = {0};
    int i, size;

fscanf(fp, "%d", &size);   //value calculated as size of stack frame to be initialized when patcher applies patch for(i = 1; i <= size; i++)
    {
        a[0x2dc+i] = 0x0;   //0x2de is value obtained as result of experiment and is distance from array
                            //a of initialization function to start point of stack frame of caller
    }
}
```

FIG. 12

```
#include<stdio.h>
include<memory.h> char* user_input()
{
    return "AAAAAAAAAAAAAAAAAAAAAAAAAAAAAAAAAAAAAAAAAAAA";  ←451
}
void foo()
{
    char buf [10] = {0,};
    char *input = user_input();
    strcpy(buf, input);  ←452
}
int main(void)
{
    foo();
    printf("GOOD-BYE\n");
    return 0;
}
```
450

```
                                    //since size value of third parameter is 0x63,
       push   $0x63
       lea    -0x70(%ebp),%eax      //copy content at place separated 0x70 bytes from ebp
       push   %eax
461─── lea    -0xd4(%ebp),%eax      //to place separated 0xd4 bytes from ebp
       push   %eax
       call   8048380 <strncpy@plt> // as much as 0x63
```

```
include <stdio.h>
include <string.h> define PATH-CONFIG "./config"

char* safe_strcpy(char* dest, const char *src)
{
    FILE *fp = fopen(PATH CONFIG, "r");
    char a[1] = {0};
    int i, size;
    fscanf(fp, "%d", &size);   // value calculated as size of available stack frame when patcher applies patch
    strncpy(dest, src, size);   // call strncpy by adding safe value (size) while maintaining existing parameter
}
```

470 — (code block)
471 — value calculated as size of available stack frame when patcher applies patch
472 — strncpy(dest, src, size);

METHOD AND APPARATUS FOR PATCHING BINARY HAVING VULNERABILITY

This application claims the benefit of Korean Patent Application No. 10-2018-0131473, filed on Oct. 31, 2018, in the Korean Intellectual Property Office, the disclosure of which is incorporated herein by reference in its entirety.

BACKGROUND

1. Field

The inventive concept relates to a method and an apparatus for patching a binary having vulnerability, and more particularly, to a method of patching a binary having vulnerability so as to execute the binary without an error caused by the vulnerability and particularly patching a binary having vulnerabilities related to memory handling such as an error caused by an uninitialized variable, a buffer overflow, and the like.

2. Description of the Related Art

When a binary has vulnerability, an unexpected error occurs at a point in time of executing the binary. As the vulnerabilities, for example, there are known a variety of types such as a buffer overflow, an integer overflow, a memory exception, malformed-input, a race condition, a symbolic link, a null pointer, and the like. Since some functions of the binary may be corrected without permission for inappropriate purpose or a system in which the binary is executed may cause a security issue due to the vulnerabilities, it is necessary to quickly and accurately overcome vulnerability of a binary executed in a system important in security.

Particularly, there are a large number of binaries which are incompletely memory-handled during a development process. For example, cases such as occurrence of an unexpected result value caused by incomplete initialization of a variable of a function, a progress of a function to a wrong divergence, incomplete exception of a buffer overflow, occurrence of a segmentation fault caused by an input value error, and the like frequently occur. Accordingly, it is necessary to provide a technique of patching a binary having vulnerability related to memory handling.

SUMMARY

Aspects of the inventive concept provide a method of effectively patching a binary having vulnerability related to memory handling.

Aspects of the inventive concept also provide a method of patching a binary with minimized correction of the binary by using a patch targeted at some designated vulnerable functions.

Aspects of the inventive concept also provide a method of effectively patching a binary having vulnerability caused by incomplete initialization of a variable.

Aspects of the inventive concept also provide a method of effectively patching a binary having vulnerability such as occurrence of a buffer overflow.

It should be noted that objects of the inventive concept are not limited to the above-described objects, and other objects of the inventive concept will be apparent to those skilled in the art from the following descriptions.

According to the present disclosure, there is provided a method of patching a binary having vulnerability. The method comprises loading a first binary to be patched, into a memory, generating a second binary by patching to call a stack frame initialization function from a vulnerable function of the first binary, executing the stack frame initialization function by calling the vulnerable function when the second binary is executed and initializing a stack frame area of the vulnerable function so as to automatically initialize a variable declared in the vulnerable function.

According to an exemplary embodiment of the present disclosure, the generating of the second binary comprises storing a plurality of pieces of data, generated while the patch is executed, in a database. wherein a key of the database is a serial number of a stack frame initialization patcher, and a value of the database comprises a hash value of the first binary, a path of the first binary, a hash value of the second binary, a path of the second binary, a serial number of a type of the patch applied by the stack frame initialization patcher, an input value used while the patch is executed, and information on whether the patch succeeds.

According to an exemplary embodiment of the present disclosure, the generating of the second binary comprises obtaining a stack frame size of the vulnerable function by analyzing a first analysis-target block included in a basic block of the vulnerable function in the first binary for each instruction storing the stack frame size in an execution setting file; and generating a patch point at a part immediately behind the first analysis-target block and inserting a caller block of the stack frame initialization function into the patch point.

According to an exemplary embodiment of the present disclosure, the obtaining of the stack frame size of the vulnerable function by analyzing the first analysis-target block for each instruction comprises obtaining the stack frame size by using a stack pointer register value of the first analysis-target block.

According to an exemplary embodiment of the present disclosure, the obtaining of the stack frame size of the vulnerable function by analyzing the first analysis-target block for each instruction comprises checking whether a stack smashing protector (SSP) which generates a canary area is applied to the first binary to prevent a buffer overflow; and excluding a size of the canary area from the stack frame size not to initialize the canary area.

According to an exemplary embodiment of the present disclosure, the checking of whether the SSP is applied to the first binary comprises a primary verification operation of checking whether the SSP is applied to the binary by using a script which verifies whether the SSP is applied to the first binary; and a secondary verification operation of checking whether the canary area is present in the vulnerable function by analyzing a second analysis-target block of the vulnerable function.

According to an exemplary embodiment of the present disclosure, the initializing of the stack frame area of the vulnerable function so as to automatically initialize the variable declared in the vulnerable function comprises initializing the stack frame of the vulnerable function by using a value obtained by calculating, by the stack frame initialization function, a distance from a point where a local variable of the stack frame initialization function is stored to a start point of the stack frame of the vulnerable function and the stack frame size.

According to the present disclosure, there is provided a method of patching a binary having vulnerability. The method comprises loading a first binary to be patched, into a memory, generating a second binary by patching so as to call a buffer size verification function instead of calling a vulnerable function of the first binary; and executing the buffer size verification function in advance of executing the vulnerable function when the second binary is executed and executing the vulnerable function after a buffer size of the vulnerable function is verified so as to automatically prevent a buffer overflow from occurring in the vulnerable function.

According to an exemplary embodiment of the present disclosure, the generating of the second binary comprises obtaining a maximum stack availability value of the vulnerable function by analyzing a caller block of the vulnerable function in the first binary, storing the maximum stack availability value in an execution setting file, and substituting a caller block of the buffer size verification function for the caller block of the vulnerable function.

According to an exemplary embodiment of the present disclosure, the generating of the second binary comprises obtaining a maximum stack availability value of the vulnerable function by analyzing a caller block of the vulnerable function in the first binary, storing the maximum stack availability value in an execution setting file; and substituting a caller block of the buffer size verification function for the caller block of the vulnerable function.

According to an exemplary embodiment of the present disclosure, the obtaining of the maximum stack availability value of the vulnerable function by analyzing the caller block of the vulnerable function comprises, checking whether an SSP, which generates a canary area to prevent a buffer overflow, is applied to the first binary, and excluding a size of the canary area from the maximum stack availability value in order for a buffer writing operation not to be allowed for the canary area.

According to an exemplary embodiment of the present disclosure, the checking of whether the SSP is applied to the binary comprises a primary verification operation of checking whether the SSP is applied to the binary by using a script which verifies whether the SSP is applied to the first binary; and a secondary verification operation of checking whether the canary area is present in the vulnerable function by analyzing a second analysis-target block of the vulnerable function.

According to an exemplary embodiment of the present disclosure, the executing of the vulnerable function after the buffer size of the vulnerable function is verified so as to automatically prevent the buffer overflow from occurring in the vulnerable function comprises calling the buffer size verification function so as to verify whether the buffer size of the vulnerable function exceeds the maximum stack availability value; and changing the buffer size of the vulnerable function by using the maximum stack availability value and then calling the vulnerable function when the buffer size of the vulnerable function exceeds the maximum stack availability value.

According to an exemplary embodiment of the present disclosure, the generating of the second binary comprises storing a plurality of pieces of data, generated while the patch is executed, in a database, and wherein a key of the database is a serial number of a buffer size verification patcher, and a value of the database comprises a hash value of the first binary, a path of the first binary, a hash value of the second binary, a path of the second binary, a serial number of a type of the patch applied by the buffer size verification patcher, an input value used while the patch is executed, and information on whether the patch succeeds.

BRIEF DESCRIPTION OF THE DRAWINGS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Figure 1:
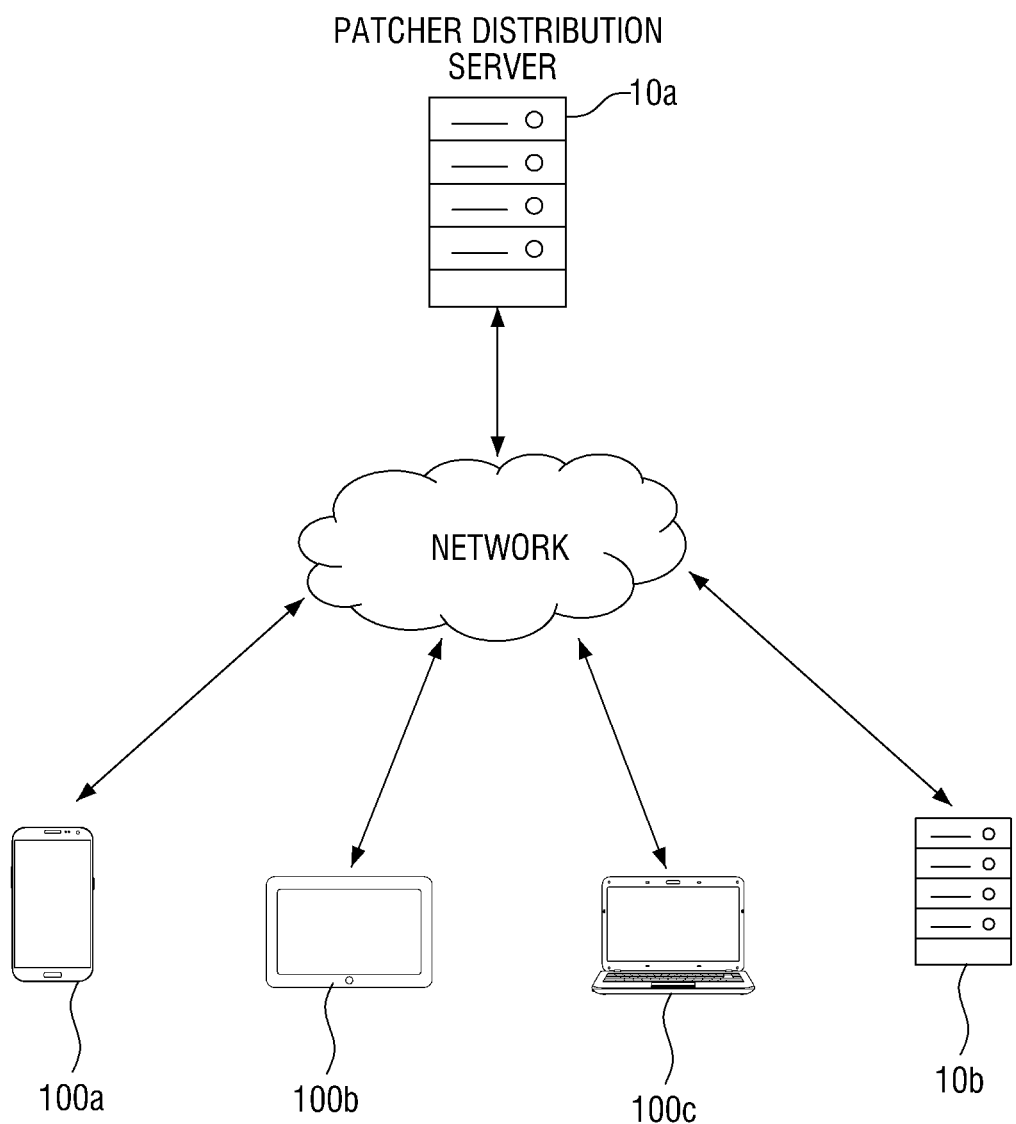
Figure 2:
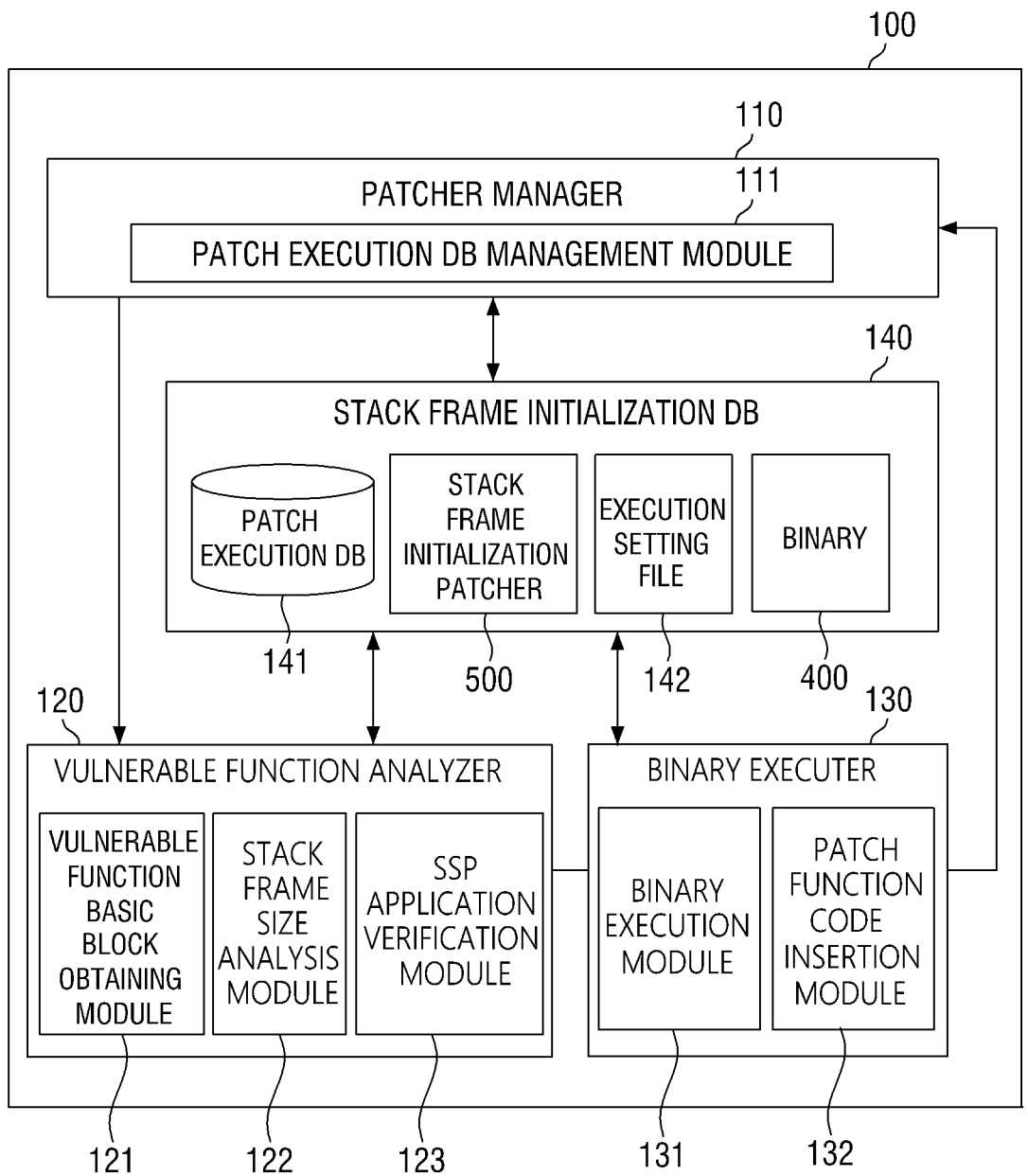
Figure 3:
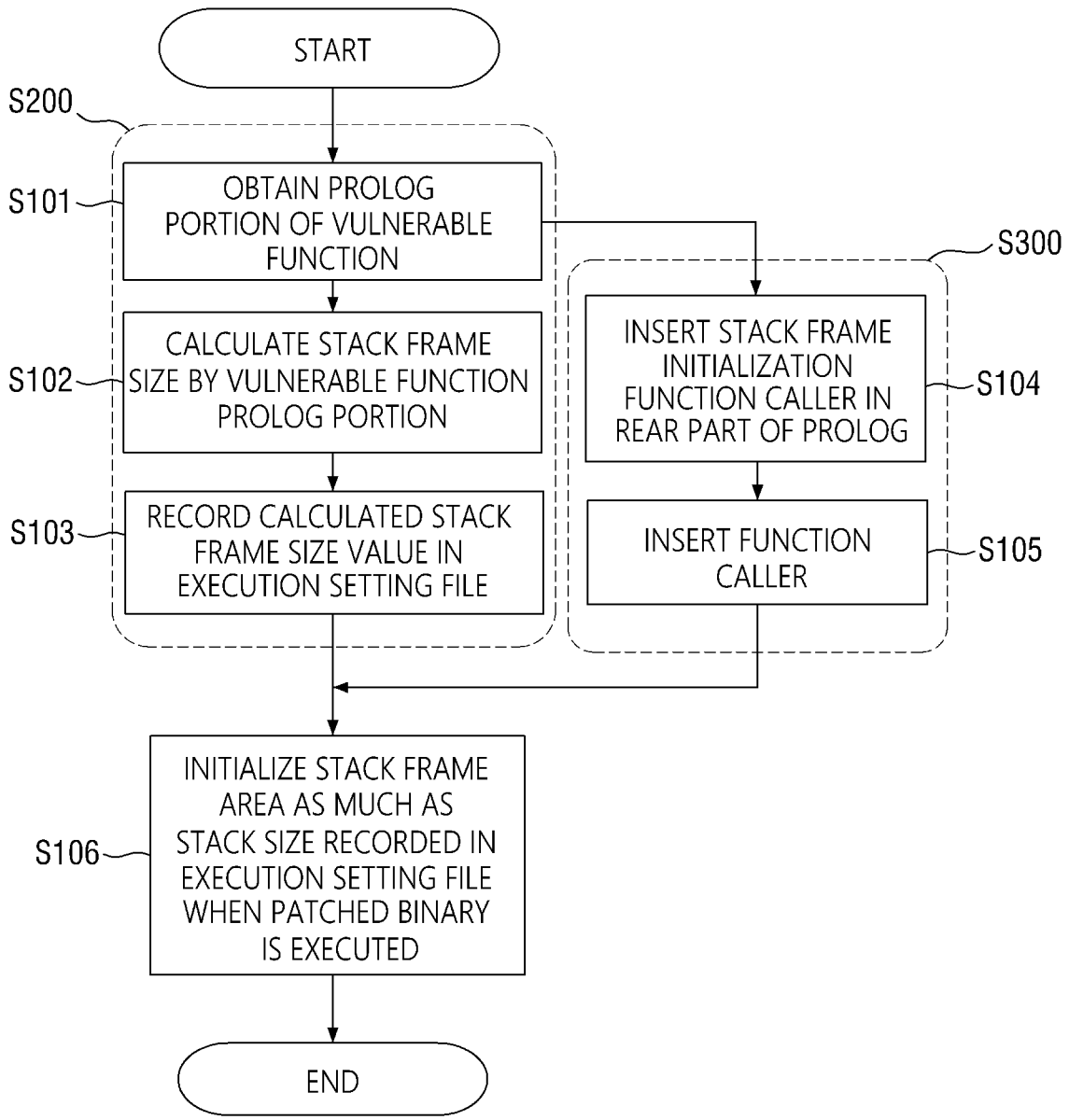
Figure 5:
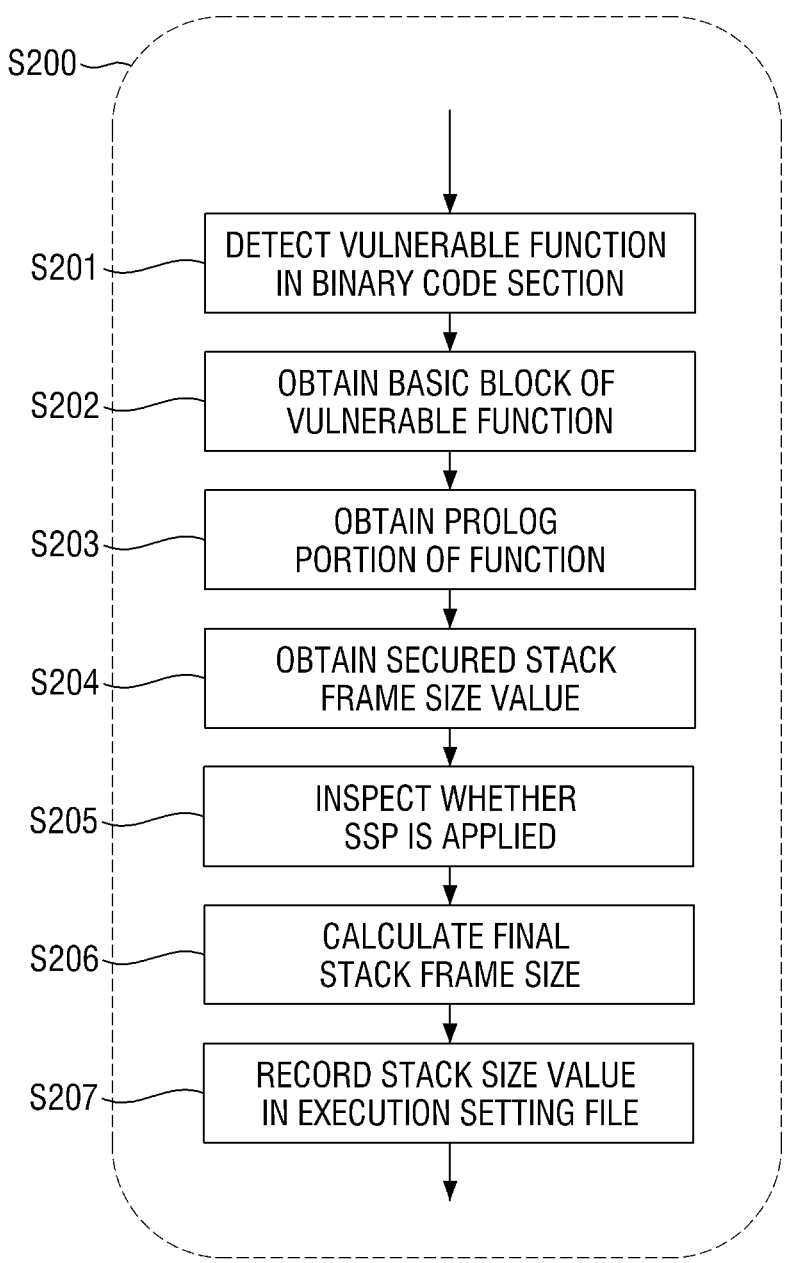
Figures 6, 7:
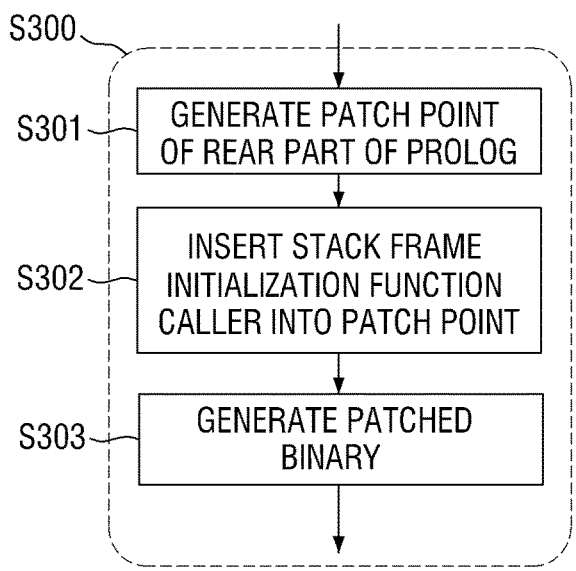
Figure 9:
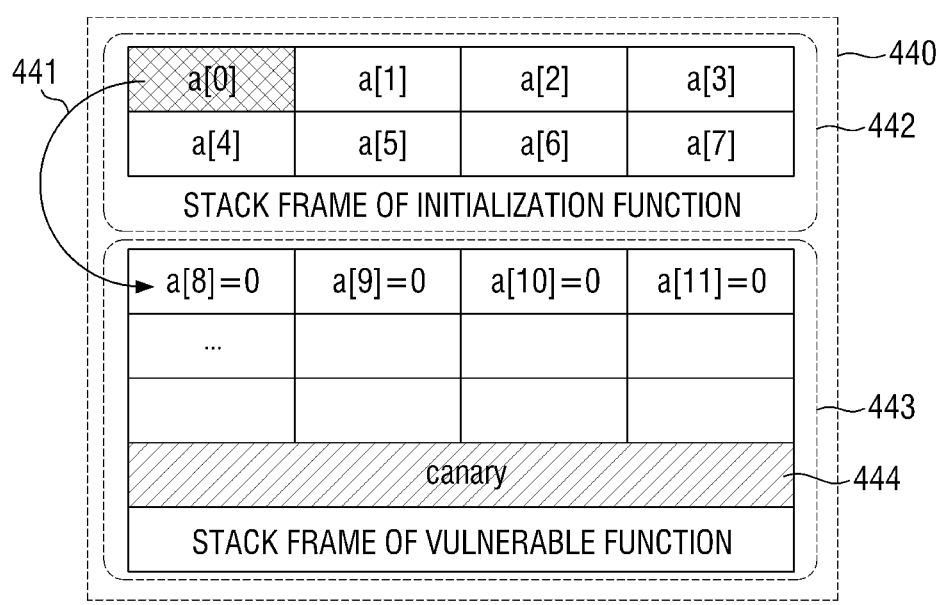
Figure 10:
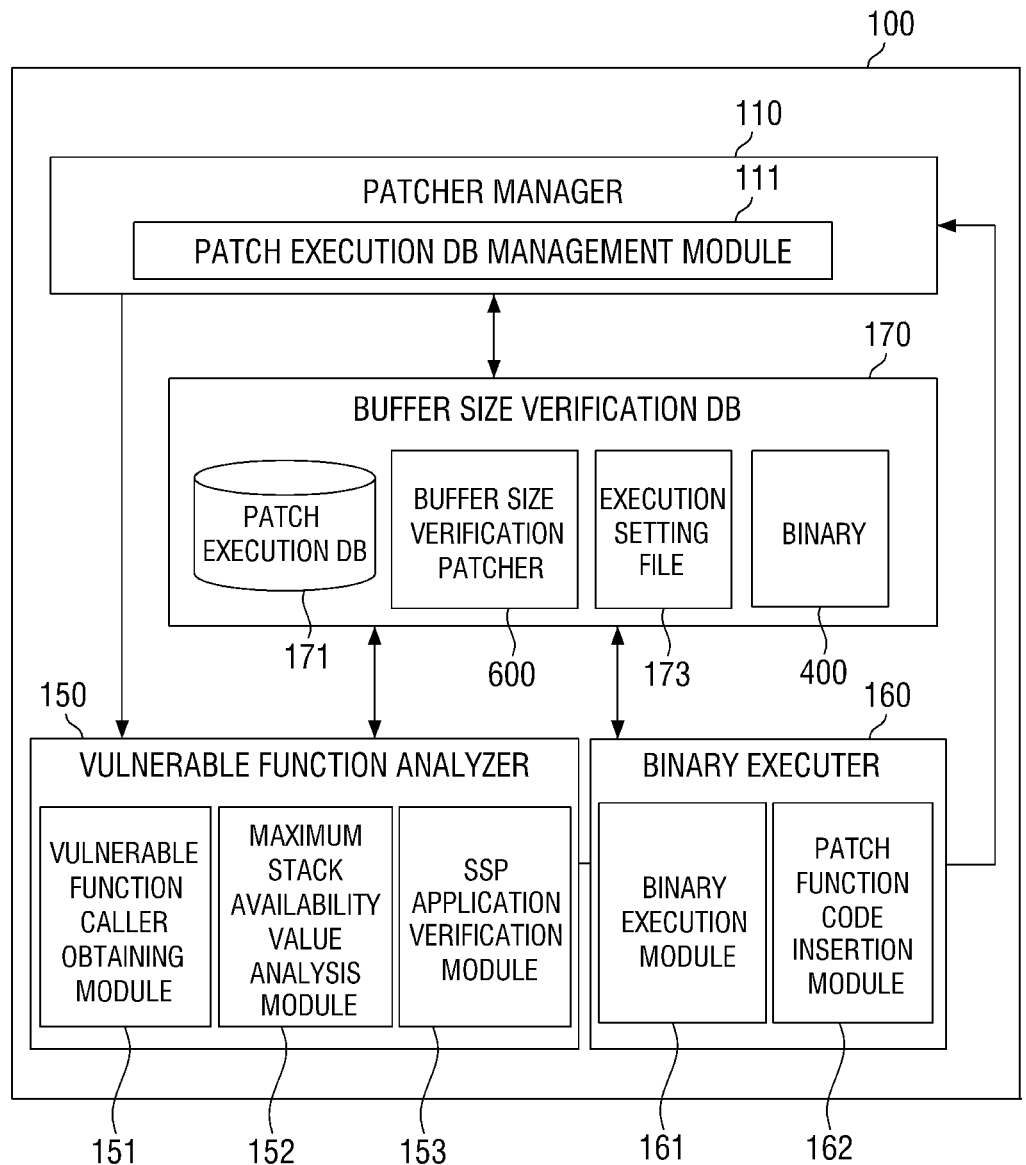
Figure 11:
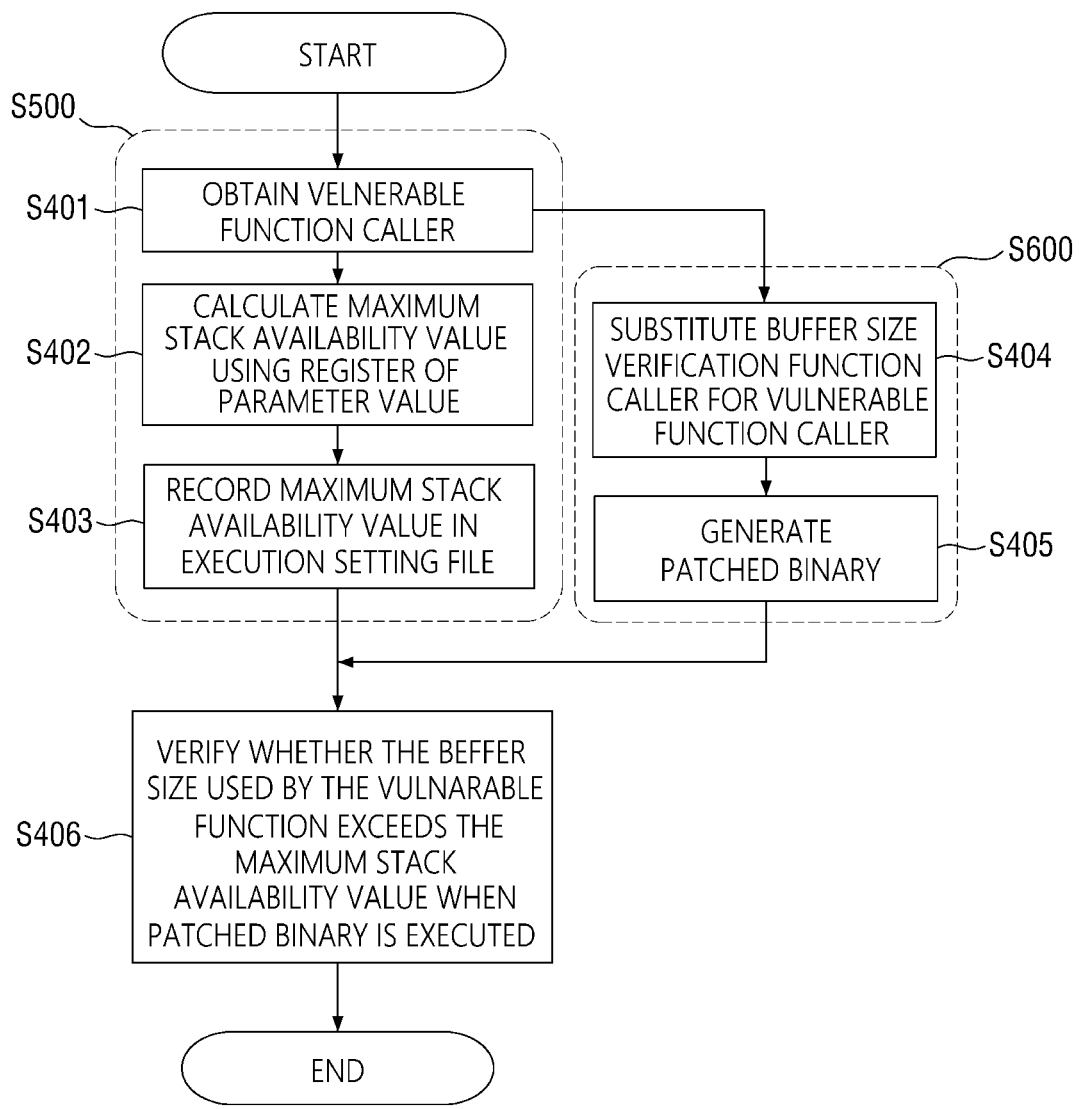
Figure 13:
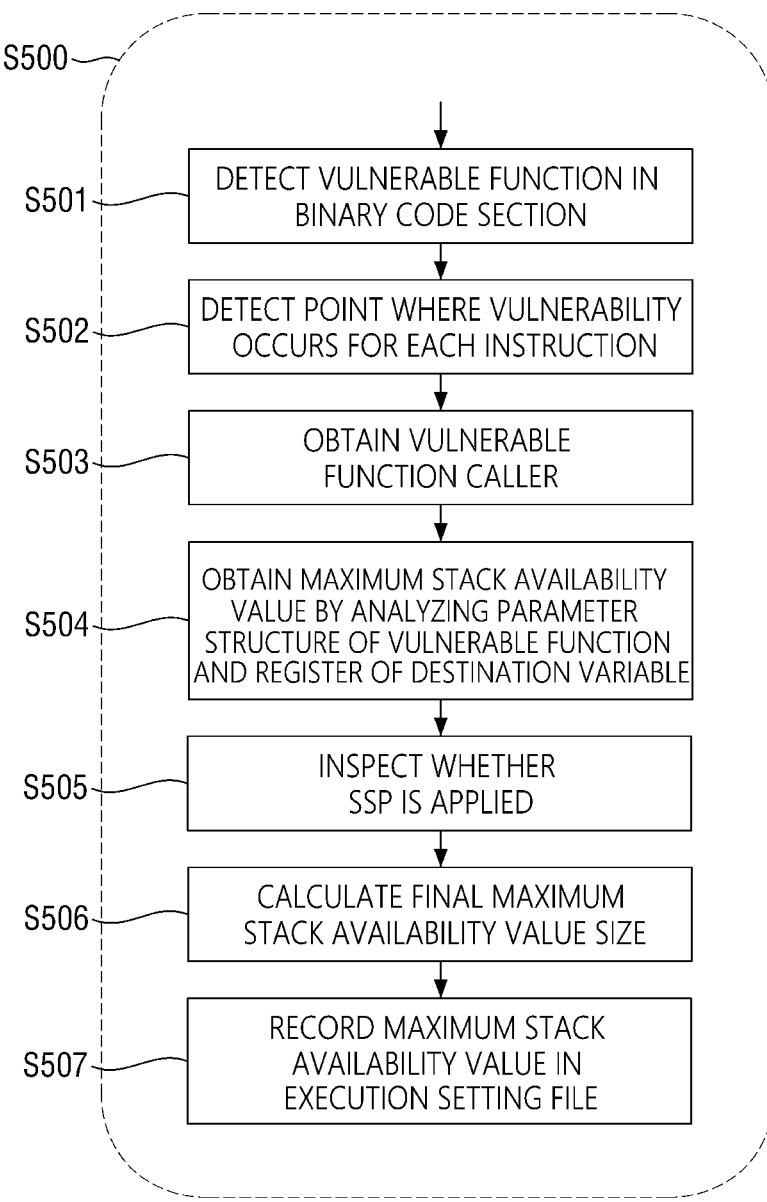
Figures 14, 15:
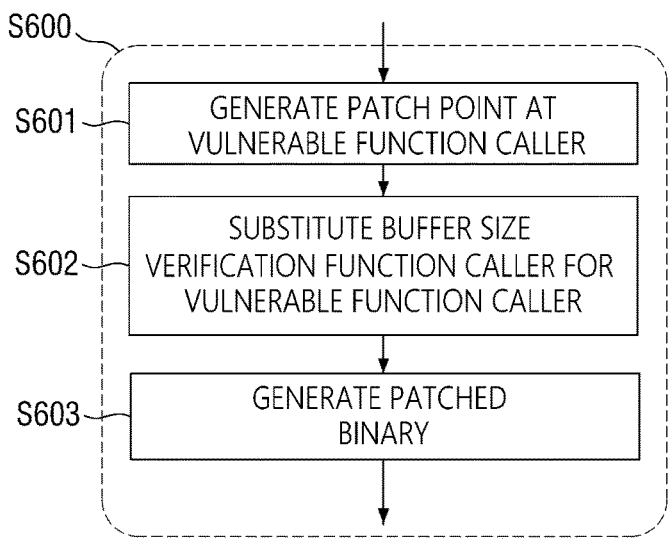
Figure 17:
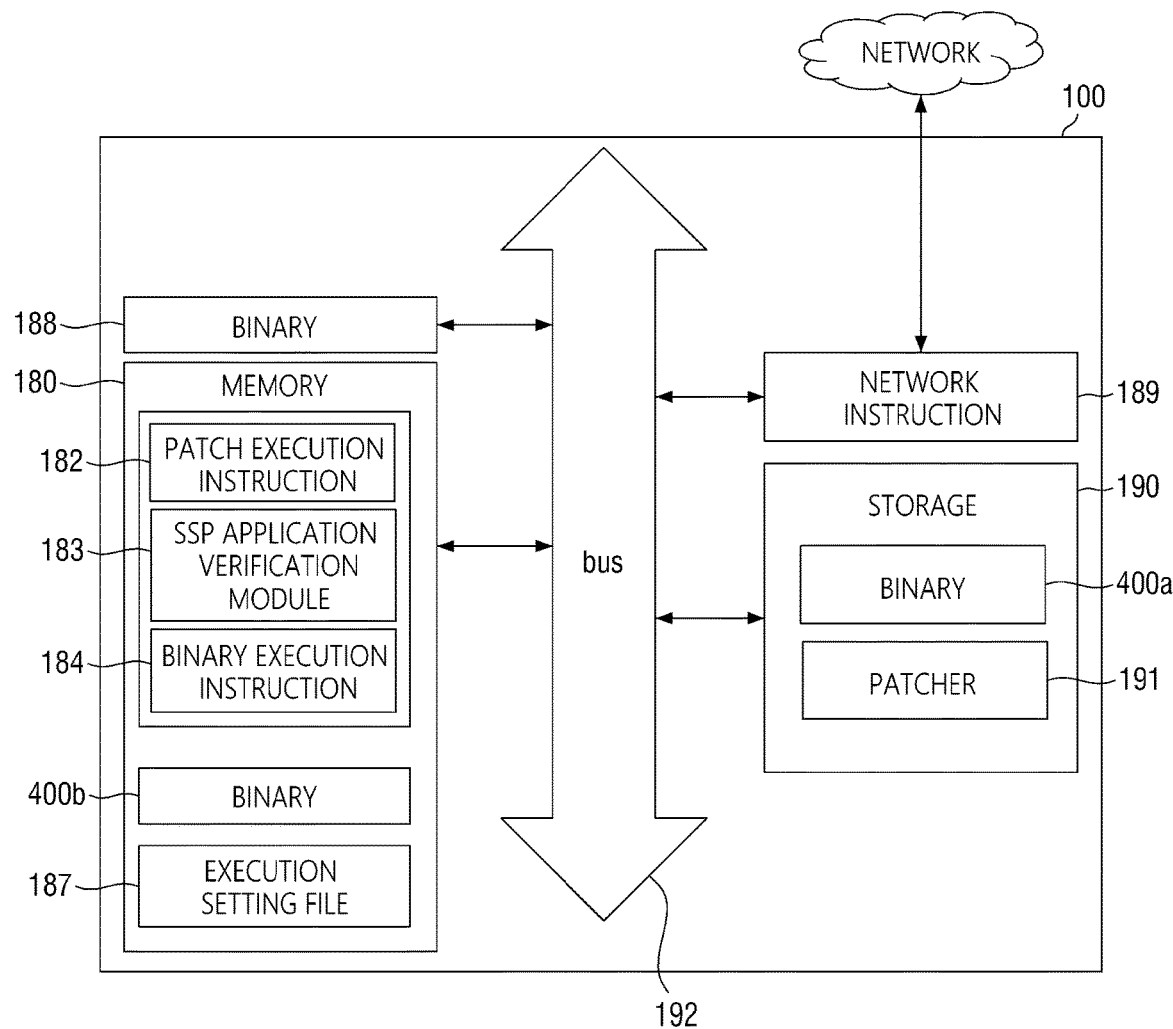

The above and other aspects and features of the present disclosure will become more apparent by describing in detail exemplary embodiments thereof with reference to the attached drawings, in which:

FIG. 1 is a configuration diagram of a system for patching a binary having vulnerability according to some exemplary embodiments of the inventive concept;

FIG. 2 is a block configuration diagram of a patching apparatus for initializing a stack frame with respect a binary having vulnerability according to other exemplary embodiments of the inventive concept;

FIG. 3 is a flowchart of a patching method for initializing a stack frame with respect a binary having vulnerability according to still other exemplary embodiments of the inventive concept;

FIG. 4 is a view illustrating an example of a vulnerable function present in a binary on which a patch for initializing a stack frame is performed with reference to FIG. 3;

FIG. 5 is a flowchart illustrating some operations of FIG. 3 in detail;

FIG. 6 is a view illustrating an example of a first analysis-target block in a vulnerable function present in a binary on which a patch for initializing a stack frame is performed with reference to FIG. 5;

FIG. 7 is a flowchart illustrating some operations of FIG. 3 in detail;

FIG. 8 is a view illustrating an example of a source code of a function for initializing a stack frame of a vulnerable function when a second binary is executed with reference to FIG. 7;

FIG. 9 is a view illustrating an example of a stack frame of an initializing function and a stack frame of a vulnerable function with reference to FIG. 8;

FIG. 10 is a block configuration diagram of a patching apparatus for verifying a buffer size with respect a binary having vulnerability according to yet other exemplary embodiments of the inventive concept;

FIG. 11 is a flowchart of a patching method for verifying a buffer size with respect a binary having vulnerability according to still other exemplary embodiments of the inventive concept;

FIG. 12 is a view illustrating an example of a source code of a vulnerable function present in a binary on which a patch for verifying a buffer size is executed with reference to FIG. 11;

FIG. 13 is a flowchart illustrating some operations of FIG. 11 in detail;

FIG. 14 is a view illustrating an example of a caller of a vulnerable function present in a binary on which a patch for verifying a buffer size is executed with reference to FIG. 13;

FIG. 15 is a flowchart illustrating some operations of FIG. 3 in detail;

FIG. 16 is a view illustrating an example of a source code of a function for verifying a buffer size of a vulnerable function when a second binary is executed with reference to FIG. 15; and FIG. 17 is a configuration diagram of hardware of an apparatus for patching a binary having vulnerability according to some exemplary embodiments of the inventive concept.

DETAILED DESCRIPTION OF THE EMBODIMENTS

A large number of binaries are distributed to users while having a variety of vulnerabilities. The vulnerabilities refer to problems embedded in the binaries which may cause a variety of error situations such as errors related to a memory, vulnerabilities related to security, termination of execution without permission, occurrence of an infinite loop, and the like while the binaries are executed. The vulnerabilities may be classified into, for example, a variety of types such as a buffer overflow, an integer overflow, a memory exception, malformed-input, a race condition, a symbolic link, a null pointer, and the like.

A binary developer may simply cure vulnerabilities of a binary by correcting a source code of the binary. However, when it is impossible to secure the source code of the binary due to a variety of causes, it is necessary to patch the binary itself. When execution of a binary with vulnerabilities present therein in a variety of computing devices is neglected, a variety of problems such as security risks and the like may occur.

A large percentage of vulnerabilities relate to memory handling. For example, when a variable is not initialized after declaration, a variety of problems may occur due to setting of a waste value in the declared variable when the binary is executed. Also, when error handling for a situation in which data of which size exceeds a buffer size is copied to a corresponding buffer is not precisely performed, a variety of problems caused thereby may occur. Some exemplary embodiments of the inventive concept relate to a binary patch for overcoming the above-described types of vulnerabilities.

The definitions of the terms used herein are as follows.

A first binary means a vulnerable binary which is an object to be patched before a patch is executed, and a second binary means a binary which has been patched by a stack frame initialization patcher. In the specification, it should be noted that the first binary and the second binary are limited to 32 bits.

A first analysis-target block means a prolog portion which sets a stack frame to be used by a function among blocks included in basic blocks of the function.

A second analysis-target block is an epilog portion which restores a stack such that the function completes an operation and then returns to a point of being called. When a stack smashing protector (SSP) is applied to the binary, a canary area is generated directly on the second analysis-target block.

A vulnerable function is a function in which a cause of vulnerability present in the binary is located. When a patch is executed, a binary block related to the vulnerable function is corrected. In the specification, the vulnerable function means a function in which an error occurs due to incomplete initialization of a variable or a buffer overflow occurs due to use of a buffer of which size exceeds an available buffer size.

The patcher is a file generated by compiling a source code which describes an instrumentation operation of executing a patch for overcoming the vulnerability. Although the patcher means a mutator file in which the source code describing the instrumentation operation is generated by a dynamic instrumentation tool referred to as dyninst, since the scope and target of instrumentation are limited to a patch, the mutator file is referred to as the patcher.

In the specification, a stack frame initialization patcher for initializing a variable and a buffer size verification patcher for preventing a buffer overflow will be described as examples of the patcher.

Hereinafter, some exemplary embodiments of the inventive concept will be described with reference to the drawings.

FIG. 1 is a configuration diagram of a system for patching a binary having vulnerability according to some exemplary embodiments of the inventive concept.

As shown in FIG. 1, a patcher distribution server 10a may distribute patchers to computing devices 100a, 100b, 100c, and 10b which store binaries to be patched through a network. The computing devices 100a, 100b, 100c, and 10b may patch a first binary by executing the distributed patcher.

It should be noted that the computing device may be a user terminal 100a, 100b, or 100c such as a smart phone, a table personal computer (PC), a laptop PC, a desktop PC, and the like or may be a server device 10b providing other services.

The patcher distribution server 10a and the computing devices 100a, 100b, 100c, and 10b may be, for example, computing devices including an arithmetic processor.

Hereinafter, a method of executing a patch for initializing a stack frame on a first binary with vulnerability caused by incomplete initialization of a variable according to other exemplary embodiments of the inventive concept will be described with reference to FIGS. 2 to 9, and then a method of executing a patch for verifying a buffer size on a first binary in which a buffer overflow occurs according to still other exemplary embodiments of the inventive concept will be described with reference to FIGS. 10 to 16.

Hereinafter, a configuration of a computing device on which a stack frame initialization patch is executed will be described with reference to FIG. 2, and a method of patching a first binary by executing the stack frame initialization patch and initializing a stack frame of a vulnerable function by executing a second binary will be described with reference to FIG. 3.

As shown in FIG. 2, a computing device 100 which patches vulnerability of a binary according to the embodiment may include at least one of a patcher manager 110, a vulnerable function analyzer 120, a binary executer 130, and a stack frame initialization database (DB) 140.

The patcher manager 110 is an interface of an apparatus for patching initialization of a stack frame and may refer to a software or hardware module which performs an operation of relaying an input to the computing device 100, which executes a stack frame initialization patch or an output from the computing device 100. The patcher manager 110 may include a module 111 which manages a patch execution DB. In the embodiment, when a stack frame initialization patcher 500 is input to the computing device 100, a serial number of the patcher, an input value for executing a patch, a patch execution history, and the like may be stored in the DB and be managed by the patcher manager 110.

Table 1 is an example of a table of a patch execution DB 141 managed by the patcher manager 110. A patch execution number which is a key of the patch execution DB is a serial number of a stack frame initialization patcher. A value may include a first binary hash value, a first binary path, a second binary hash value, a second binary path, an applied patch type number, an input value used in executing a patch, and information on whether a patch succeeds.

TABLE 1

| Name | Type of data | Note |
| --- | --- | --- |
| PatchNo | INTEGER | Patch execution number, key |
| binaryHash | VARCHAR | Hash value of original binary before patch |
| binaryPath | VARCHAR | Path of original binary before patch |
| pBinaryHash | VARCHAR | Hash value of patched binary |
| pBinaryPath | VARCHAR | Path of patched binary |
| patchType | INTEGER | Serial number of applied patch type |
| inputValue | VARCHAR | Input value used while patch is executed |
| Result | BOOL | Whether patch succeeds |

The stack frame initialization DB 140 may include the patch execution DB 141, the stack frame initialization patcher 500 received from the patch distribution server of FIG. 1, an execution setting file 142, and a binary 400.

The vulnerable function analyzer 120 may include a module 121 which obtains a basic block of a vulnerable function present in the first binary 400 provided from the patcher manager 110, a module 122 which calculates a size of a stack frame of the vulnerable function, and a module 123 which verifies whether an SSP is applied to the first binary 400.

The module 121 which obtains the basic block of the vulnerable function may obtain the basic block by detecting a vulnerable function area in a code section (.text) of the first binary 400.

The stack frame size analysis module 122 may calculate a size of a stack frame to be initialized for solving an error occurring due to a variable of a vulnerable function which is not initialized. The calculated final stack frame size is stored in the execution setting file 142. A detailed description thereof will be described with reference to FIG. 5.

When the SSP is applied to the first binary 400, the module 123 which verifies whether the SSP is applied to the first binary may verify whether the SSP is applied, such that a canary area present in the stack frame is not initialized.

The SSP is one of methods of protecting a memory to prevent a buffer overflow and generates a canary area for each function at a point in time of compiling a binary. That is, the canary area is generated at an upper part of a second analysis-target block in the stack frame, to protect the second analysis-target block area of the stack frame in which a return address to which the function should return after the completion is stored. Also, immediately before the function returns, the canary area is compared with an initial canary area. When data in the canary area is changed, it is determined that a buffer flow occurs in the function and the change in the data may not be stored and the function may be finished.

Accordingly, when the stack frame initialization patcher initializes the canary area of the stack frame of the vulnerable function, the function may be finished at an unexpected point in time. In order to prevent this, the SSP verification module 123 may verify whether the SSP is applied to the first binary 400. When the SSP is applied, the stack frame size analysis module 122 may exclude a size of the canary area from the final stack frame size.

FIG. 9 illustrates a case in which a canary area 444 is present in a stack frame area 443 of the vulnerable function. Here, it may be checked that the canary area 444 is generated directly on a second analysis-target block (not shown) which is a lowermost end of the stack frame area 443 of the vulnerable function.

Referring back to FIG. 2, the binary executer 130 may include a module 132 which executes a patch for inserting a stack frame initialization function into the first binary 400 and a binary execution module 131 which executes the second binary 400.

When the second binary is executed by the binary execution module 131, the stack frame of the vulnerable function may be initialized as much as the stack frame size by using the stack frame size stored in the execution setting file 142.

The patch function code insertion module 132 may execute a patch for inserting a caller of the stack frame function into a rear part of the first analysis-target block of the vulnerable function of the first binary. Also, whether the second binary is normally generated as a result of executing the patch may be transmitted to the patcher manager 110.

Since each of the elements 110, 120, 130, and 140 shown in FIG. 2 operates in cooperation with one another when actually executed, one of the elements is not necessarily executed and finished prior to other modules or executed after.

It should be noted that the vulnerable function analyzer 120, the binary executer 130, and the stack frame initialization DB 140 may be configured as physically separated exclusive computing devices or at least some of them may be configured as components of a software module or a hardware module in one computing device.

Next, a stack frame initialization patching method according to exemplary embodiments of the inventive concept will be described with reference to FIGS. 3 to 9. The stack frame initialization patching method according to the embodiment may be performed by an electronic device. The electronic device may be, for example, a computing device. The computing device may be, for example, a computing device which performs stack frame initialization described above with reference to FIGS. 1 and 2. It should be noted that at least some operations of the computing device described with reference to FIGS. 1 and 2 may be included in the stack frame initialization patching method. Accordingly, even when an additional disclosure is not present in a following description of the stack frame initialization patching method, the operations of the computing device which have been described with reference to FIGS. 1 and 2 may be included in the stack frame initialization patching method. Also, when a disclosure with respect to a subject of operations is not present in the following description of the method, the subject may be interpreted as the computing device which performs stack frame initialization.

First, overall operations according to the embodiment will be schematically described with reference to FIG. 3.

In operation S101, a first analysis-target block of a vulnerable function present in a first binary may be obtained. A stack frame for storing a variable used by the vulnerable function when the vulnerable function is executed may be set in the first analysis-target block.

In operation S102, a memory size for a stack frame which is assigned for setting the stack frame in the first analysis-target block may be calculated. Hereinafter, the memory size may be expressed as a stack frame size. Also, a register value of the first analysis-target block is analyzed such that a stack frame size of the vulnerable function may be calculated. A process of calculating the stack frame size will be described in detail with reference to FIG. 5.

In operation S103, the stack frame size may be stored in an execution setting file. In operation S106, data of the execution setting file may be used when the second binary is executed.

In operation S104, a stack frame initialization function caller may be inserted into a part right behind the first analysis-target block among basic blocks of the vulnerable function obtained in operation S101.

A basic block is a set of instructions present in a binary and has one entry point and a termination point such that when a first instruction of the basic block is executed, other instructions are necessarily executed according to a sequence.

Accordingly, after the first analysis-target block of the vulnerable function is executed, a stack frame initialization function may be necessarily called.

In operation S105, as a result of a patch for inserting the stack frame initialization function which is executed in operation S104, a second binary may be generated.

In operation S106, the stack frame of the vulnerable function may be initialized as much as the stack frame size by using the second binary generated in operation S105 and the stack frame size stored in the execution setting file in operation S103. Accordingly, the stack frame is initialized at a point in time of executing the second binary such that all local variables used in the vulnerable function may also be initialized. A detailed description thereof will be described with reference to FIG. 8.

An example 430 of a vulnerable function in which a stack frame initialization patch is executed will be described in detail with reference to FIG. 4. Vulnerability may be an error which occurs due to the incomplete initialization of a variable as described above. A foo function has a problem that local variables aN and bN are declared but not initialized during declaration.

When 0 is input as an input value in a main function of a program 410 including a vulnerable function 411, the main function calls a foo function with the input value as a parameter.

When the input value is transferred as a parameter to the foo function which is a vulnerable function 412, the function proceeds to a default bifurcation of a bifurcation function switch according to the input value. At the default bifurcation of the foo function, only the local variable aN is initialized and the local variable bN is not initialized due to an error during development. Accordingly, bN has a waste value.

A repaint function in which a problem occurs receives the variable bN which is not initialized, as a parameter 414 and assigns a memory as much as the waste value of bN by using a malloc function 415. The malloc function may generate an unexpected result value by assigning the memory as much as the waste value of bN (for example, 0x827b46a9).

A method of initializing a variable by initializing a stack frame of a vulnerable function to solve the error caused by incomplete initialization of a variable will be described with reference to FIGS. 5 to 9.

First, a process of calculating a stack frame size of a vulnerable function in operation S200 of FIG. 3 will be described in detail with reference to FIGS. 5 and 6. FIG. 6 is a view illustrating an example of an instruction set corresponding to a first analysis-target block of the vulnerable function.

In operation S201, an area in which the vulnerable function is present in a code section (.text) of a first binary may be detected. The vulnerable function is assumed to be identified as a function which already has vulnerability.

In operation S202, basic blocks of the vulnerable function area may be obtained from the first binary.

In operation S203, a first analysis-target block including first three instructions among the obtained basic blocks may be obtained. The first analysis-target block may include instructions for setting a stack frame of a function after the function is called.

In operation S204, a stack frame size of the vulnerable function may be detected using instructions of the first analysis-target block.

FIG. 6 is an example of a first analysis-target block 420 of a vulnerable function. Hereinafter, a process of calculating a stack frame size of the vulnerable function will be described with reference to FIG. 6. An ebp register indicates a start address of the stack frame, and an esp register indicates a final address of the stack frame. That is, the ebp register may refer to a bottom of the stack frame, and the esp register may refer to a top of the stack frame. Accordingly, a difference value between the ebp register and the esp register may be a size of the corresponding stack frame.

A move instruction may allow the ebp register to refer to the same address as that of the esp register. Afterwards, a value of the esp register is reduced as much as 0x10 through a sub instruction such that the stack frame size of the vulnerable function may be calculated as 0x10.

Referring back to FIG. 5, in the case of the example, the stack frame size obtained in operation S204 may be 0x10.

In operation S205, it may be inspected whether an SSP is applied to a first binary.

In operation S206, when it is inspected in operation S205 that the SSP is applied to the first binary, a size of a canary area may be excluded from the calculated stack frame size.

Hereinafter, operations S205 and S206 will be described in detail. First, in operation S205, an operation of inspecting whether the SSP is applied may include two sub-operations.

In a first verification operation, a checksec.sh script is used such that whether the SSP is applied to the first binary may be verified.

In a second verification operation, a second analysis-target block of the vulnerable function is analyzed such that whether a caller of a_stack_chk_fail( ) function is present may be verified. A case in which the SSP is partially applied to the vulnerable function of the first binary may be verified through the second verification operation in the embodiment.

In operation S206, when it is determined through the first verification operation and the second verification operation that the SSP is applied to the vulnerable function of the binary, 4 bytes of an address value size which is the canary area size on the basis of a 32-bit-binary may be excluded from the stack frame size.

In operation S207, the calculated final stack frame size may be stored in an execution setting file.

Hereinafter, a process of executing a patch for inserting a stack frame initialization function into a first binary in operation S300 of FIG. 3 will be described with reference to FIG. 7.

In operation S301, a patch point may be generated immediately behind the first analysis-target block of the vulnerable function.

In operation S302, a stack frame initialization function caller block may be inserted into the patch point. Accordingly, the vulnerable function is called such that a stack frame initialization function may be automatically called.

In operation S303, a second binary is generated as a result of the patch.

Hereinafter, a method of initializing, by the stack frame initialization function, the vulnerable function when the generated second binary is executed will be described in detail with reference to FIGS. 8 and 9.

FIG. 8 illustrates an example of a program 430 which initializes a stack frame of a vulnerable function according to some exemplary embodiments of the inventive concept, and FIG. 9 illustrates an example of a stack frame area 440 corresponding to an initialization function and a vulnerable function.

An init function is an example of a stack frame initialization function, a size variable value is a stack frame size 431 calculated by the above-described stack frame initialization patcher. Stack frame initialization may be formed of a for statement 432.

For example, a vulnerable function may be initialized using a local variable array a in an init function whose size is declared as 1 by the for statement 432. That is, an area of the init function in which the array a exceeds 1 that is a size declared in advance is initialized such that a stack frame area of the vulnerable function which exceeds the stack frame of the init function may be accessed and initialized.

Referring to FIG. 9, a case in which the array a declared in the initialization function exceeds a stack frame area 422 of the initialization function and accesses the stack frame area 443 of the vulnerable function such that the stack frame area 443 of the vulnerable function is initialized is illustrated. The above-described canary area 444 may not be initialized.

Referring back to FIG. 8, a problem in accessing the stack frame of the vulnerable function is that it is necessary to measure a distance between a start point of the array a and a start point of the stack frame of the vulnerable function. In the embodiment, it is detected through an experiment that a position separated 0x2de from the start point of the array a is the start point of the stack frame of the vulnerable function.

Accordingly, the stack frame of the vulnerable function may be initialized by initializing an area as much as the calculated stack frame size from the position separated 0x2de from the start point of the array a such that all local variables present in the vulnerable function may also be initialized.

Hereinafter, a method of executing a buffer size verification patch on a first binary in which vulnerability of a buffer overflow is present according to still other embodiments of the inventive concept will be described with reference to FIGS. 10 to 16. Since FIG. 2 illustrates a large number of components corresponding to those of FIG. 9, only components which do not overlap will be described in detail.

A configuration of a computing device in which a buffer size verification patch is executed will be described with reference to FIG. 10, and a method of patching a first binary by executing the buffer size verification patch and verifying a buffer size of a vulnerable function by executing a second binary will be described with reference to FIG. 11.

As shown in FIG. 10, a computing device 100 which patches vulnerability of a binary according to the embodiment may include at least one of a patcher manager 110, a vulnerable function analyzer 150, a binary executer 160, and a buffer size verification DB 170.

The buffer size verification DB 170 may include a patch execution DB 171, a buffer size verification patcher 600 received from the patch distribution server of FIG. 1, an execution setting file 173, and a binary 400.

The vulnerable function analyzer 150 may include a module 151 which obtains a caller block of a vulnerable function present in the binary 400 provided from the patcher manager 110, a module 152 which analyzes a maximum stack availability value of the vulnerable function, and a module 153 which verifies whether an SSP is applied to the binary.

The module 151 which obtains the caller of the vulnerable function may detect an area of the vulnerable function in a code section of the first binary and may obtain the caller block which calls the vulnerable function.

The maximum stack availability value analysis module 152 may obtain a maximum stack availability value which allows a buffer writing operation in a patch environment of the binary by analyzing a parameter structure of the vulnerable function. A detailed description thereof will be described with reference to FIG. 13.

The SSP application verification module 153 may verify whether the SSP is applied to the first binary in order for the buffer writing operation not to be allowed for the canary area when the SSP is applied to the first binary. When the SSP is applied, the maximum stack availability value analysis module 152 may exclude a size of the canary area from a final maximum stack availability value.

The binary executer 160 may include a module 162 which substitutes a buffer size verification function caller for the vulnerable function caller of the first binary 400 and a binary execution module 161 which executes a second binary.

When the second binary is executed in the binary execution module 161, the second binary may verify whether the buffer size of the vulnerable function exceeds a maximum stack availability value by using the maximum stack availability value stored in the execution setting file 173.

The patch function code substitution module 162 may execute a patch of substituting the buffer size verification function caller for the vulnerable function caller of the first binary and may execute a patch of calling the vulnerable function from the buffer size verification function. Also, whether the second binary is normally generated as a result of executing the patch may be transmitted to the patcher manager 110.

Next, a method of patching for verification of a buffer size according to still other embodiments of the inventive concept will be described with reference to FIGS. 11 to 16.

First, overall operations according to the embodiment will be schematically described with reference to FIG. 11.

In operation S401, a caller block of a vulnerable function present in a first binary may be obtained. A caller of the vulnerable function may include a set of instructions of storing parameters input to the vulnerable function.

In operation S402, a maximum stack availability value capable of being used in a patch environment of the binary may be calculated using a register which indicates a parameter. Particularly, a register which indicates a destination parameter among parameters may be used. A process of calculating the maximum stack availability value will be described in detail with reference to FIG. 13.

In operation S403, the maximum stack availability value may be stored in an execution setting file. In operation S406, data of the execution setting file may be used when a second binary is executed.

In operation S404, the vulnerable function caller block obtained in operation S401 may be substituted by the buffer size verification function. Also, the vulnerable function caller may be inserted into a block of the buffer size verification function.

In operation S405, the second binary which has been completely patched in operation S404 may be generated.

In operation S406, whether the buffer size used by the vulnerable function exceeds the maximum stack availability value may be verified using the second binary generated in operation S405 and the maximum stack availability value stored in the execution setting file such that a buffer overflow may be prevented from occurring in the vulnerable function by executing the vulnerable function whose buffer size is verified by the buffer size verification function at a point in time of executing the second binary. A detailed description thereof will be described with reference to FIG. 8.

An example 450 of a vulnerable function in which a buffer size verification patch is executed will be described with reference to FIG. 12. Vulnerability may be a buffer overflow which occurs due to use of a buffer having a size exceeding an available buffer size in an execution environment as described above. A strcpy function has a problem that a parameter value which exceeds an allowable buffer size in a binary execution environment is input.

A foo function is called from a main function, and a user_input function is called from the foo function. Also, an input value 451 returned to the foo function by the user_input function is input as a parameter to the strcpy function called from the foo function. Here, an input value 452 input to the strcpy function exceeds a size of a buf array such that a buffer overflow occurs. In this case, for example, a segmentation error may occur.

A method of patching a binary to verify a buffer size used by a vulnerable function to prevent the occurrence of the buffer overflow will be described with reference to FIGS. 13 to 16.

First, a process of calculating a maximum stack availability value of a vulnerable function in operation S500 of FIG. 11 will be described in detail with reference to FIGS. 13 and 14. FIG. 14 is a view illustrating an instruction set corresponding to a caller of a vulnerable function.

Referring to FIG. 13, in operation S501, an area in which a vulnerable function is present may be detected in a code section (.text) of a first binary.

In operation S502, a precise vulnerability occurrence place may be further detected once more in units of instructions in the vulnerable function area detected in operation S501.

In operation S503, a caller block which calls the vulnerable function may be obtained.

In operation S504, a parameter corresponding to a destination is detected by analyzing a parameter structure of the vulnerable function. A buffer size verification patcher is assumed to know a turn of a destination parameter among one or more parameters for each function. For example, a memory replication function may be defined as a structure of a general function (destination, source, and size). Otherwise, in FIG. 12, in the case of strcpy, a buf array may be a destination, input may be a source, and a size may be 10 which is a size of the buf array.

When the destination parameter is detected, an instruction execution portion of inserting a destination parameter into a stack may be further detected from a vulnerable function caller block of the binary.

FIG. 14 illustrates an example of a vulnerable function strcpy caller 460. A process of calculating a maximum stack availability value by using a register which indicates a destination parameter will be described in detail with reference to FIG. 14.

In the case of a parameter of the strcpy function, a register value with respect to a destination parameter is stored on a stack for last. Accordingly, in the case of a push instruction in an instruction set 461 related to the destination parameter in the strcpy caller, an eax register value indicating the destination parameter is stacked on the stack. Also, a lea instruction allows an eax register to indicate an address of a place separated 0xd4 from ebp, which indicates a start address of a function. In this case, the eax register indicates the last of the stack. Accordingly, the maximum stack availability value may be 0xd4.

Accordingly, the maximum stack availability value may be from an ebp register indicating a start of the stack to a return address (ret) area which stores an address to which the function returns after completion.

Referring back to FIG. 13, the maximum stack availability value of operation S504 may be 0xd4 in the example.

In operation S505, whether the SSP is applied to the first binary may be inspected according to the method described above with reference to FIG. 5.

In operation S506, when it is inspected in operation S505 that the SSP is applied to the first binary, a size of a canary area may be excluded from the calculated maximum stack availability value.

In operation S507, the calculated final maximum stack availability value may be stored in an execution setting file.

Hereinafter, a process of executing a patch for substituting a buffer size verification function caller for a vulnerable function caller of a first binary in operation S600 of FIG. 11 will be described in detail with reference to FIG. 15.

In operation S601, a patch point may be generated in a caller which calls a vulnerable function.

In operation S602, the patch point may be substituted with the buffer size verification function caller and a patch is executed to call the vulnerable function in the buffer size verification function. Accordingly, before the vulnerable function is called, the buffer size verification function is called in advance such that the vulnerable function with the buffer size being verified may be automatically executed.

In operation S603, a second binary is generated as a result of the patch.

Hereinafter, a method of executing the buffer size verification function after the buffer of the vulnerable function is verified when the generated second binary is executed will be described with reference to FIG. 16.

FIG. 16 illustrates an example of a program 470 which verifies a buffer size of a vulnerable function according to some exemplary embodiments of the inventive concept. In the embodiment, the vulnerable function is a strcpy function of FIG. 12, the buffer size verification function is a safe_strcpy, and the vulnerable function executed after the buffer size is verified in the buffer size verification function is strncpy. That is, a caller of strcpy may be substituted with a safe_strcpy caller in the first binary, and a patch is executed to call strncpy in a safe_strcpy function.

In the second binary generated as a result of the patch, safe_strcpy is executed instead of executing strcpy such that a maximum stack availability value which allows a buffer writing operation in a binary patch environment is obtained 471. Then the strncpy function is executed within a range of the maximum stack availability value 472 such that a buffer overflow which may occur in strcpy may be prevented.

Next, a configuration and operation of an apparatus for patching a binary having vulnerability according to still other embodiments of the inventive concept will be described with reference to FIG. 17. As shown in FIG. 17, the computing device 100 in which a patch is executed according to the embodiment includes a processor 188 and a memory 180 and may further include at least one of a storage 190, a network interface 189, and a system bus 192 in some embodiments. One or more instructions loaded and stored in the memory 180 are executed by the processor 188. It should be noted that the computing device 100 which executes a patch for a binary according to the embodiment may perform operations related to the apparatus for executing a patch for a binary described above with reference to FIGS. 1, 2, and 10 and operations related to the method of executing a patch for a binary described above with reference to FIGS. 3 to 9 and 11 to 16.

The network interface 189 may allow a patch-target binary 400a provided from an external device through a network, a stack frame initialization patcher, and a buffer size verification patcher 191 to be stored in the storage 190.

The one or more instructions may include a patch execution instruction 182 of loading 400b the patch-target binary 400a into a memory and executing a patch thereon, an SSP application verification module 183 which verifies whether an SSP is applied to the patch-target binary 400b, and a binary execution instruction 184 which executes the patched binary 400b and prevents vulnerability by using data of an execution setting file 187.

In one embodiment, a patch execution instruction 183 may execute a patch of inserting a stack frame initialization function into a vulnerable function present in the binary 400a having vulnerability caused by incomplete initialization of a variable stored in the storage 190 by using the stack frame initialization patcher 191.

In one embodiment, the binary execution instruction 184 may initialize a stack frame of a vulnerable function present in the binary 400a having vulnerability caused by incomplete initialization of a variable stored in the storage 190 by executing the binary 400a.

In one embodiment, the patch execution instruction 183 may execute a patch of substituting a buffer size verification function for a vulnerable function caller present in the binary 400a having a risk of occurrence of a buffer overflow stored in the storage 190 by using the buffer size verification patcher 191.

In one embodiment, the binary execution instruction 184 may verify and execute a buffer size of a vulnerable function present in the binary 400a having a risk of occurrence of a buffer overflow stored in the storage 190 by executing the binary 400a.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of patching a binary having vulnerability, the method comprising:
    loading a first binary to be patched, into a memory;
    generating a second binary by patching so as to call a buffer size verification function instead of calling a vulnerable function of the first binary; and
    executing the buffer size verification function in advance of executing the vulnerable function when the second binary is executed and executing the vulnerable function after a buffer size of the vulnerable function is verified so as to automatically prevent a buffer overflow from occurring in the vulnerable function,
    wherein the generating of the second binary comprises:
    obtaining a maximum stack availability value of the vulnerable function by analyzing a caller block of the vulnerable function in the first binary;
    storing the maximum stack availability value in an execution setting file; and
    substituting a caller block of the buffer size verification function for the caller block of the vulnerable function.

2. The method of claim 1, wherein the obtaining of the maximum stack availability value of the vulnerable function by analyzing the caller block of the vulnerable function comprises:
    obtaining a turn of a destination parameter among parameters of the vulnerable function by analyzing a parameter structure of the vulnerable function; and
    obtaining the maximum stack availability value by using a value of a register in which the destination parameter is stored.

3. The method of claim 1, wherein the obtaining of the maximum stack availability value of the vulnerable function by analyzing the caller block of the vulnerable function comprises:
    checking whether an SSP, which generates a canary area to prevent a buffer overflow, is applied to the first binary; and
    excluding a size of the canary area from the maximum stack availability value in order for a buffer writing operation not to be allowed for the canary area.

4. The method of claim 3, wherein the checking of whether the SSP is applied to the binary comprises:
    a primary verification operation of checking whether the SSP is applied to the binary by using a script which verifies whether the SSP is applied to the first binary; and
    a secondary verification operation of checking whether the canary area is present in the vulnerable function by analyzing a second analysis-target block of the vulnerable function.

5. The method of claim 1, wherein the executing of the vulnerable function after the buffer size of the vulnerable function is verified so as to automatically prevent the buffer overflow from occurring in the vulnerable function comprises:
    calling the buffer size verification function so as to verify whether the buffer size of the vulnerable function exceeds the maximum stack availability value; and
    changing the buffer size of the vulnerable function by using the maximum stack availability value and then calling the vulnerable function when the buffer size of the vulnerable function exceeds the maximum stack availability value.

6. The method of claim 1, wherein the generating of the second binary comprises storing a plurality of pieces of data, generated while the patch is executed, in a database, and wherein a key of the database is a serial number of a buffer size verification patcher, and a value of the database comprises a hash value of the first binary, a path of the first binary, a hash value of the second binary, a path of the second binary, a serial number of a type of the patch applied by the buffer size verification patcher, an input value used while the patch is executed, and information on whether the patch succeeds.

* * * * *